3,060,826
PHOTOGRAPHIC CAMERA
Erwin Weller, Calmbach (Enz), Germany, assignor to Alfred Gauthier G.m.b.H., Calmbach (Enz), Germany, a corporation of Germany
Filed Feb. 16, 1960, Ser. No. 8,987
Claims priority, application Germany Feb. 19, 1959
4 Claims. (Cl. 95—64)

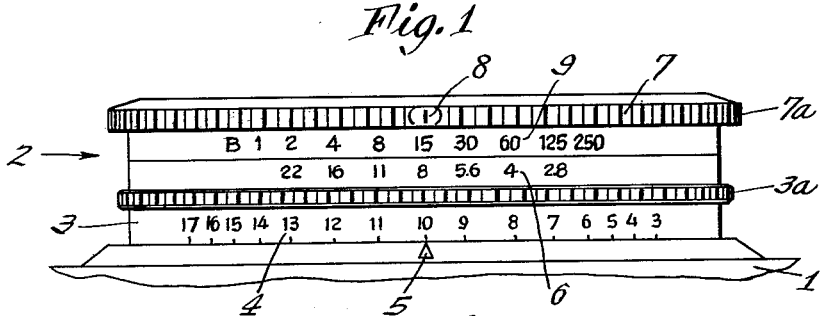
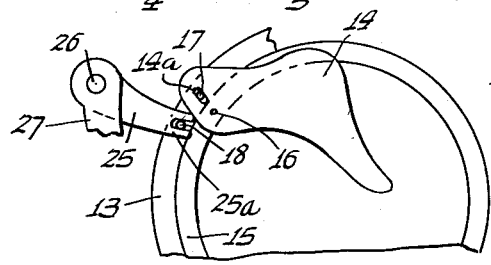
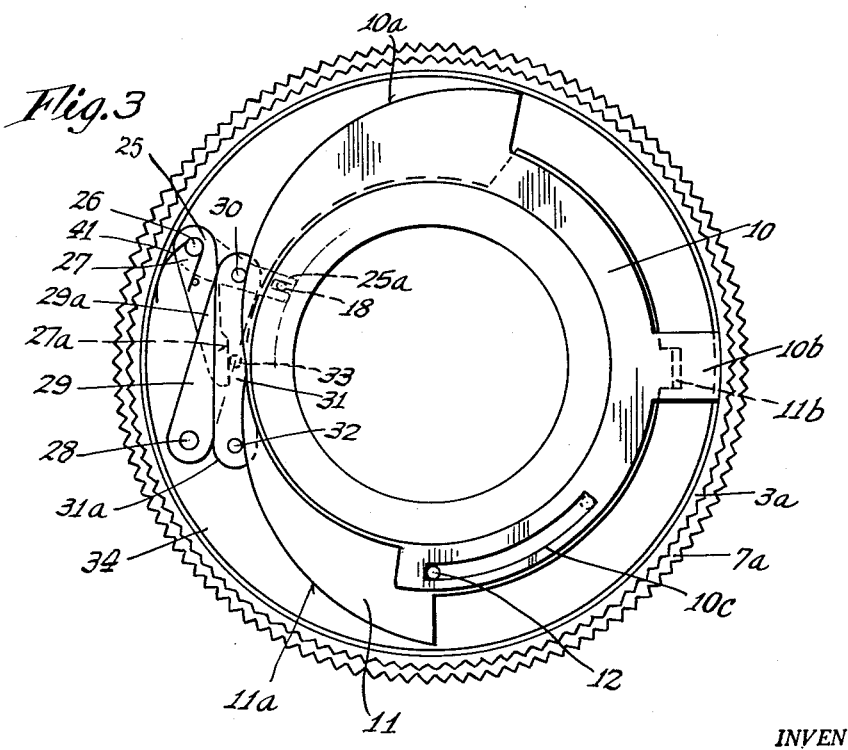

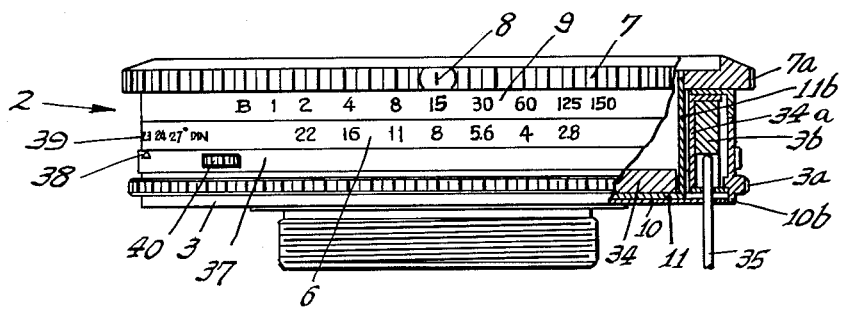
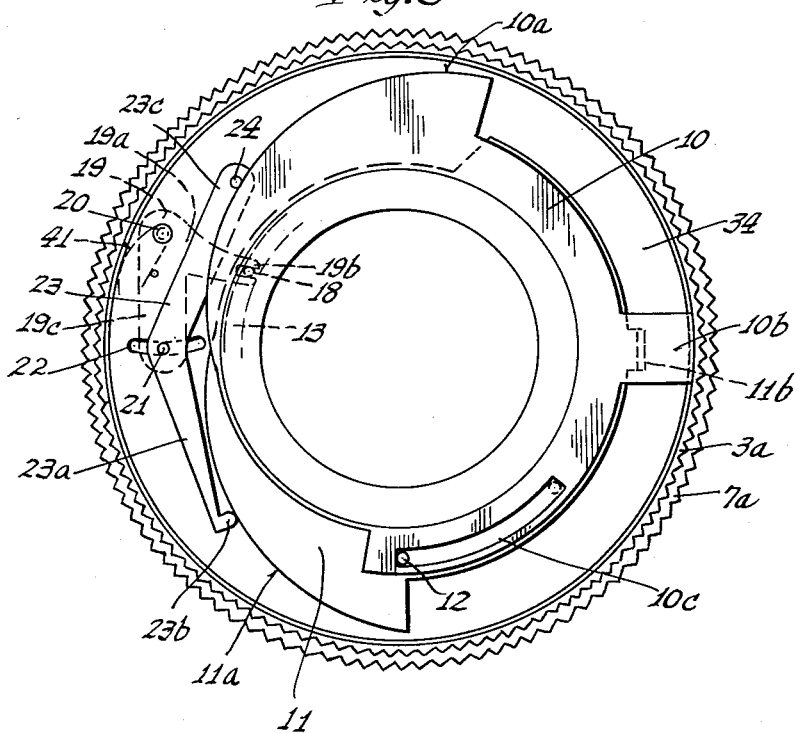

This invention relates to photographic cameras of the type wherein an exposure value setting member is coupled with the diaphragm and shutter speed adjusting mechanisms to effect adjustment of the same, said setting member being also arranged so that it may additionally effect independent adjustment of only one of these mechanisms, whereas a second settable member is provided to effect adjustment of the other mechanism.

Various cameras of the above-described kind, for effecting a semi-automatic or fully automatic exposure setting, have been proposed and produced in the past. In some of these cameras, the connection between the exposure value setting member and the second setting member which adjusts either the diaphragm or the shutter speed, is effected by means of a toothed differential gear. While this construction has operated satisfactorily, it involved an appreciable expenditure or cost in producing the necessary structural members, and further required appreciable space for such members. In addition, the play or lost motion resulting from the various gear members caused a small but perceptible inaccuracy in the settings of the camera.

In other camera structures of the above kind, one set of bearings for the diaphragm blades is connected, by means of a carrier or supporting ring, to an exposure value setting member which is settable with respect to a stationary scale, whereas the remaining set of bearings for the diaphragm blades is connected by means of another carrier ring to an exposure time or speed setting member.

This latter type of construction, as compared with cameras involving a toothed differential gear, has the advantage of a less complicated construction and an easy method of producing the connecting members between the diaphragm blades and the exposure value setting member on the one hand, and the exposure time or speed setting member on the other hand. However, there were still drawbacks in this latter device, inasmuch as it required a considerable amount of space, both in axial and radial directions. This is due to the fact that the diaphragm is associated with two axially staggered or stepped carrier rings which are separated or spaced from the shutter blades by means of a separate cover disc. The additional space requirement caused by this arrangement resulted in an increased distance or space being necessary between the diaphragm blades and the shutter blades, and this involved difficulty in the construction of the lens assembly.

In addition to the above drawbacks and disadvantages, the direct driving connection between diaphragm, speed, and exposure value setting members necessitated the provision of a clearance slot in the side wall of the shutter housing, since the shutter mechanism arranged in the interior of the housing does not leave any space or clearance for the connection means of the setting members. Since such slot must cover the entire exposure value range and must therefore have a length which is equal to the length of the diaphragm adjusting range and the shutter speed adjusting range, the shutter housing is weakened considerably, and to avoid the adverse effects of such weakening the housing wall is made thicker which, in turn, undesirably increases the diameter of the shutter.

Irrespective of the above-described disadvantages, all cameras of the above type have the advantage that the entire diaphragm and shutter speed adjusting range is accessible to and may be covered by a single setting member. In addition, a mutually independent adjustment of the setting members for exposure values, shutter speed or diaphragm, both in the sense of an exposure-value setting and in the sense of a speed-diaphragm selection at a constant exposure value setting does not require the operation of any coupling device. Further, the above-described cameras are characterized by scales wherein the rows of speed and diaphragm values are reciprocally so arranged and adjustable that for a specific exposure value all speed-diaphragm pairs associated therewith can be read off in a continuous row, either juxtaposed or superposed (arranged side by side or underneath each other).

It is an object of the present invention to provide a camera of the type outlined, wherein the above disadvantages and difficulties are obviated while the above-described advantages with respect to the setting operations are fully preserved or retained.

This is accomplished, in accordance with the invention, by the provision of a novel driving connection between a movable exposure value setting member on the one hand and a second movable setting member on the other hand, which latter member is arranged to adjust one of the exposure factors embracing either the diaphragm aperture or else the shutter speed. The said novel driving connection is of the lost-motion type which permits a relative adjusting movement between the said two setting members, such relative movement corresponding to the length of the adjusting range of the exposure factor which is intended to be additionally independently adjusted by the exposure value setting member. Further, the invention provides cam devices between the exposure value setting member and the said second setting member on the one hand, and the adjustment mechanism for that one of the exposure factors which is intended to be additionally independently settable by shifting or adjusting the exposure value setting member. The said cam devices are so arranged that the last-named (additionally independent) exposure factor may be set at a value coordinated to the set value of the other exposure factor so as to produce a pair of speed diaphragm values corresponding to the indication given by the scale at the exposure value setting member.

A camera constructed in this manner has, in common with the prior cameras explained above, the outstanding advantage of a simple and favorable setting for the various required exposures. In addition, the organization as provided by the invention results in a great saving of space, both in radial and axial directions, and moreover requires but a small number of structural members in an arrangement which provides substantial advantages with regard to the fabrication of the members and the assembly of the same. In addition, the construction as provided by the invention eliminates to the maximum extent any play or lost motion between the setting members, which might result in errors in the setting of the camera.

An adjusting device as thus provided by the invention can be used with equal advantage in cameras of all types, especially cameras arranged for semi-automatic or fully automatic exposure settings. The simple construction provided by the invention, embracing the setting members and connections between these and the diaphragm and speed adjusting mechanisms, together with the relatively small space required to accommodate the same, result in the important advantage that no complicated demands are made on the usual or conventional camera construction.

A simple and economical organization as provided by the invention, which is especially favorable from the standpoint of manufacturing production, embraces the use of two separate cams, one of which is connected to the exposure value setting member, whereas the other is connected to the said second setting member (which latter adjusts either the shutter speed or diaphragm aperture), in conjunction with a differential type cam follower device arranged to be cooperable with the said cams, said differential follower being connected to that one of the adjusting mechanisms which is not directly controlled by the said second setting member.

A particularly advantageous arrangement, as regards simplicity of construction and a saving of space, is had when the two setting members are arranged as concentric rings, with the two cams being provided with curved camming edges which act to apply force in radial directions, said cams actuating one or more levers whose axes are substantially parallel to the axis of the concentric setting members.

According to a further construction as provided by the invention, the exposure factor which may be directly controlled by the exposure value setting member may be advantageously constituted as the diaphragm aperture. This correlation offers the advantage that only small adjusting forces need be utilized in effecting a shifting or adjustment of the exposure value setting member, since the diaphragm mechanism can always be constructed in a manner to be very easily adjustable.

In the figures and following specification two embodiments of the invention are explained and described, relating to a photographic intra-lens shutter assemblage.

FIGURE 1 is a fragmentary top plan view of a camera construction as provided by the invention, said view illustrating an intra-lens shutter assemblage mounted on the front camera wall. The said shutter assemblage includes an exposure value setting ring which is coupled to the adjusting devices or mechanisms for shutter speed and diaphragm aperture and which ring constitutes at the same time the diaphragm setting member. Also shown is a separate, second manually adjustable setting ring which is connected to the adjusting mechanism for the shutter speed.

FIGURE 2 is a fragmentary rear elevational view of components disposed within the intra-lens shutter assemblage of FIGURE 1, said components including a diaphragm adjusting ring and a control member acting thereon for the purpose of setting the diaphragm blades at various specified positions corresponding to different values of the aperture.

FIGURE 3 is a rear elevational view of the intra-lens shutter assemblage of FIGURE 1, illustrating the cam devices as provided by the invention.

FIGURE 4 is a top plan view of an intra-lens shutter assemblage as provided by the invention and illustrating a modification, said assemblage having a preset control for cooperation with an exposure meter such as is carried in the camera case for the purpose of effecting semi-automatic exposure settings. The mechanism of the exposure meter preset control is only partially shown.

FIGURE 5 is a view similar to that of FIGURE 3 but illustrating another embodiment of the invention wherein a different type of cam follower control is provided.

Referring first to FIGURE 1, the front portion or wall of a photographic camera is indicated by the numeral 1. Mounted on the front wall 1 is an intra-lens shutter assemblage 2, said assemblage being affixed in a well-known manner. The shutter assemblage 2 comprises an exposure value setting ring 3 connected in a manner to be described later to an adjusting device or mechanism (shown in FIGURE 2) for altering or varying the diaphragm aperture and also connected to a well-known adjusting device or mechanism (not shown) for varying the shutter speed. A suitable type of shutter speed or exposure time mechanism which may be utilized with the setting and control means of the present invention is illustrated and described in detail in U.S. Patent No. 1,843,265 and copending application Serial No. 685,939, filed Sept. 24, 1957, now Patent Number 2,961,935, issued November 29, 1960, entitled Photographic Shutter. Details of such speed regulating mechanism are accordingly not described herein. The exposure value setting ring 3 is referrable to a fixed setting or index mark 5 mounted on the camera case, and is provided with a usual type exposure value scale 4 cooperable with the said mark. In addition to the exposure value scale 4, a diaphragm aperture scale 6 is provided on the exposure value setting ring 3. An exposure time or shutter speed setting ring 7 is rotatably mounted on the intra-lens shutter assemblage 2 and arranged to be concentric with respect to the exposure value setting ring 3. As shown, the speed setting ring 7 is at the front of the shutter assemblage 2, and may have an index mark 8 which is cooperable with a stationary shutter speed scale 9. The index mark 8 also serves simultaneously as a setting mark for the diaphragm scale 6. To insure easy operability, knurled rims 3a and 7a are provided on the setting rings 3 and 7, respectively.

In accordance with the present invention, the exposure value setting ring 3 and the speed setting ring 7 on the one hand, and the adjusting device or mechanism for the diaphragm aperture on the other hand are connected or coupled by a novel cam means whereby the diaphragm aperture can be set at a value, taken with the set shutter speed value, which produces a pair of speed-diaphragm values corresponding to the reading or indication had at the scale 4 of the exposure value setting member 3. This organization also provides for an additional, independent adjustment of the diaphragm aperture by the exposure value setting ring 3. Further, a novel driving connection is provided between the exposure value setting ring 3 and the speed setting ring 7, said driving connection being of the lost-motion type whereby a relative adjustment or movement of the two setting rings is possible, having an extent which corresponds to the full length of the diaphragm adjusting range. Such organization as provided by the invention results in the advantages mentioned ahead of the list of the figures.

FIGURE 3 shows in detail such a lost motion driving connection between the shutter speed and exposure value setting members, as provided by the invention, together with an associated cam device. As is apparent from the figure, the cam device comprises, in accordance with the invention, two cams 10a and 11a, the first cam being associated with or coupled to the exposure value setting ring 3, whereas the second cam is associated with or coupled to the speed setting ring 7. The two cams 10a and 11a comprise curved camming edges as shown, which are arranged to impose radially acting forces on cam follower means to be shortly described. The cams 10a and 11a are part of concentrically arranged rings 10 and 11, respectively, said rings having arms 10b and 11b extending into cooperable openings or recesses in the setting rings 3 and 7, respectively. Operable connections are thus established between the cam rings 10 and 11 and the setting rings 3 and 7, respectively.

The lost-motion driving connection as provided by the invention between the exposure value setting ring 3 and the speed setting ring 7 comprises an arcuate slot 10c extending circumferentially of the cam ring 10, said slot receiving a cooperable driving pin 12 which is fixedly secured to the cam ring 11. The length of the slot 10c corresponds to the length of the diaphragm adjusting range, i.e., from a diaphragm aperture of 2.8 to a diaphragm aperture of 22, as provided by the illustrated embodiment of the invention.

Only a small adjusting force is required for shifting the setting rings 3 and 7. This is due to the fact that the adjusting movement of one setting ring is transmitted directly to the other setting ring within the ranges of common adjustment or movement. This produces a smooth acting, soft and even adjustment over the entire adjusting range of the setting rings for speed and exposure value. This is an important advantage, both from the standpoint of effecting a manual setting of the camera and also from the standpoint of utilizing a motor-driven setting when such is used, as, for example, in cameras having an automatic exposure setting arrangement.

To effect cooperation with the cams 10a and 11a there is provided by the invention a novel differential cam follower device by means of which the motion of the cam rings 10 and 11 are converted into an adjustment of the diaphragm adjusting ring 13 shown in FIGURE 2. As is apparent from said figure, the diaphragm of the lens assemblage is of the iris type, having sectors or blades 14. However, the invention is not limited to this type of diaphragm, but instead its scope embraces any other kind of diaphragm as well.

For the sake of clarity of illustration, only one of the diaphragm blades 14 is shown in the drawings. The diaphragm blades are pivotally mounted on a stationary housing member 15 so as to be turnable about pins 16, said blades having slots 14a through which pins 17 extend, the said latter pins being affixed to the diaphragm adjusting ring 13. In addition to the pins 17, the diaphragm adjusting ring 13 has an additional pin 18 affixed to it, said pin as seen in FIGURES 2, 3 and 5 serving to adjust the ring 13 and thereby the diaphragm segments 14 by enabling motion to be transmitted to the adjusting ring 13 from a driving or control device. The said driving or control device, as provided by the invention, comprises a two-armed lever or bell crank 19 (FIGURE 5) which is pivotally mounted about an axis or pin 20 carried on the inside of the bottom wall of the shutter housing 34. The lever 19 has a fork 19b provided at one end of the lever arm 19a, and the pin 18 carried by the diaphragm adjusting ring 13 is receivable in the said fork, thereby enabling adjustment of the ring to be effected in response to pivotal movement of the lever 19. Mounted at the end of the depending lever arm 19c is a pin 21, the axis of which extends substantially parallel to the shutter axis, said pin projecting through a clearance slot 22 provided in the bottom of the shutter housing. The pin 21 constitutes an axis of rotation for a second, double-armed lever 23 having lever arms 23a and 23c of equal length. The latter arm 23a has a laterally extending lug 23b constituting a cam follower which is engageable with the cam 11a of the cam ring 11 connected to the speed setting ring 7. The other lever arm 23c is provided with a cam follower pin 24, the axis of which extends parallel to the shutter axis, the pin being engageable with the cam 10a of the cam ring 10 connected to the exposure value setting ring 3. A tensional, unidirectionally positive driving connection is at all times insured between the cams 10a and 11a on the one hand and the cam follower lever 23 on the other hand by the provision of a coil spring 41 arranged to act on the lever 19 and to bias the same in a counter-clockwise direction as viewed in FIGURE 5.

FIGURE 3 illustrates a cam device or means which differs from that shown in FIGURE 5 but carries out the same principle of the invention, namely the effecting of adjustment of an adjusting mechanism by means of cams and a differential type cam follower device engaged with the said cams.

In FIGURE 3 there is illustrated, as provided by the invention, a one-armed lever 25 affixed to a shaft 26 the axis of which is substantially parallel to the shutter axis. The shaft 26 is carried by the bottom wall of the shutter housing 34. The free end of the lever 25 has a fork 25a which accommodates the driving pin 18 affixed to the diaphragm adjusting ring 13. A second one-armed lever 27 is affixed to that end of the shaft 26 which projects on the other side of the bottom of the shutter housing. The two levers 25, 27 are thus fixedly connected to each other by the shaft 26, and a spring 41 is arranged for engagement with the lever 27 to impart a counterclockwise bias to the two levers.

There is also provided a one-armed control lever 29 which is pivotally carried by a pin 28 mounted at the rear of the bottom wall of the shutter housing. Affixed to the free end 29a of the lever 29 is a cylindrical pin 30 extending parallel to the optical axis, the pin 30 being arranged as a cam follower for engagement with the cam 10a of the cam ring 10. There is also provided a second one-armed control lever 31 which is pivotally mounted on the cylindrical cam follower pin 30 and is cooperable, by means of a cam follower pin 32 affixed to its free end 31a, with the cam 11a of the cam ring 11. Affixed to the lever 31 is a pin 33 the axis of which extends parallel to the shutter axis, said pin abutting the lug-shaped end 27a of the lever 27. The spring 41 thus establishes a tensional, uni-directionally positive connection of the levers with each other and with the cams 10a and 11a.

While FIGURE 1 shows a photographic intra-lens shutter asemblage wherein the exposure setting is effected in accordance with an exposure value scale 4 and a setting mark 5, FIGURE 4 shows an intra-lens assemblage as provided by the invention, wherein the exposure setting is effected semi-automatically, namely by causing a tracing member of an exposure meter to coincide with an indicator needle of the said meter. The tracing member is connected with the adjusting mechanism for the shutter speed and the diaphragm aperture, and may for example constitute a second needle, as will be readily understood. Since this type of tracing control is well known per se, the structures thereof and transmission members associated therewith are not shown in the drawing. Such a tracing member and exposure meter structure suitable for use herein are, for example, illustrated and explained in detail in U.S. Patent No. 2,887,026.

The intra-lens shutter assemblage illustrated in FIGURE 4 comprises, as does the shutter assemblage of FIGURE 1, an exposure value setting ring 3 positioned at the rear of the shutter housing 34. A transmission pin 35 is arranged parallel to the shutter axis and is longitudinally movable in the front portion of the camera case, said pin serving to connect the exposure value setting ring 3 to the tracing member of the exposure meter (not shown). One end of the transmission pin 35 cooperates with a ring 36 comprising a helical cam, said ring having a bearing on the side wall 34a of the shutter housing 34. The cam ring 36 is connected to the exposure value setting ring 3 in a manner which will be described later. The other end of the pin 35 (not shown) is connected with the mechanism of the tracing control (which mechanism is not shown in the drawing for the sake of clarity of illustration).

For the purpose of taking into consideration exposure factors other than the diaphragm aperture and shutter speed, as for example the factor of film sensitivity, there is provided as shown in the embodiment of FIGURE 4, an additional adjustable ring 37 which is rotatably mounted on the periphery of the setting ring 3 and has a cylindrically shaped portion or jacket as shown. The ring 37 is relatively adjustable with respect to the setting ring 3 and has a stationary mark 38 which is referable to a film sensitivity scale 39 provided on the exposure value setting ring 3. In order to fix the relative positions of the rings 3 and 37, a well-known coupling (not shown) is arranged between the film sensitivity setting ring 37 and the exposure value setting ring 3. The coupling may be engaged with and disengaged from the setting ring 37 by means of a fingerpiece 40 provided on the ring 37. In addition to the scale 39, a diaphragm scale 6 is provided on the cylindrical jacket of the setting ring 3, the scale 6 cooperating with the setting or index mark 8 of the speed setting ring 7.

In order to transmit the setting motion of the film sensitivity setting ring 37 to the tracing member of the exposure meter (not shown), the setting ring 37 is rotatably drivingly connected to the cam ring 36 in a manner not shown in the drawing. When the ring 37 is set at one of the values on the film sensitivity scale 39, the cam ring 36 is relatively adjusted with respect to the exposure value setting ring 3. After the coupling connection between the film sensitivity ring 37 and the exposure value setting ring 3 has been established, the last-named ring is also rotatably drivingly connected to the cam ring 36.

Considering FIGURES 3 and 5, the position of the pin 12 in the slot 10c and the positions of the rings 3 and 7 are not the same as those shown in FIGURE 1 where the diaphragm is indicated as having an intermediate value of 8. Instead for FIGURES 3 and 5, the diaphragm aperture has its smallest size at the value 22, and the number "22" on the scale 6 will be opposite the index mark 8 on the ring 7. From the positions of FIGURES 3 and 5 the diaphragm aperture cannot be adjusted larger starting from the value 22, but first the two rings 3 and 7 are simultaneously shifted counterclockwise to bring the pin 30, for example, at the highest spot on the cam 10a. From here a clockwise turning of the ring 3 and the coupled cam ring 10 will adjust only the diaphragm aperture through all its values, to the value 2.8 where the pin 12 engages the opposite end of the slot 10c. The shutter speed will remain constant for such adjustment of the diaphragm, at a speed which might be, for example, 1/30 sec. Thus, the positions shown in FIGURE 3 of the rings 3 and 7 do not correspond to the positions shown in FIGURE 1, and for the relative positions shown in FIGURE 1, the pin 12 would be approximately in the center of the slot 10c. Then a diaphragm value of 8 would be obtained, as indicated in FIGURE 1, and if the two rings were positioned at one particular point, turning of the exposure value setting ring 3 in either direction would then effect changes of the diaphragm only, using the diaphragm scale 6 and index 8. When the end or limit of the diaphragm adjustment has been reached, then the ring 3 would pick up the speed setting ring 7 and the remainder of the exposure value settings would be effected by changes of only the shutter speed, with the diaphragm values remaining constant at either maximum or else minimum, since the two cam rings as provided would now be turned simultaneously and in the same direction.

The above described embodiments of the invention operate in the following manner;

(1) *Setting of a specific exposure value.*—In the intra-lens shutter assemblage shown in FIGURE 1, the exposure value setting ring 3 is set so as to indicate the proper exposure value as determined by an exposure meter, said setting utilizing the exposure value scale 4 and the index mark 5.

In the intra-lens shutter assemblage shown in FIGURE 4 on the other hand, the exposure value setting ring 3 is set after a prior adjustment has been made for film sensitivity. Such prior setting involves relative adjustment between the rings 3 and 37, as above explained. After this has been done, the exposure value setting ring 3 is adjusted in accordance with the indication of the exposure meter which is coupled with the ring by means of the transmission connections and the transmission pin 35 as above explained.

In both illustrated embodiments of the invention the cam ring 10 which is connected to the exposure value setting ring 3 is driven by adjustment of the latter. In the case of the differential cam follower device as illustrated in FIGURE 3, this by means of the cam 10a causes the control lever 31 (having the cam follower pin 30 engaged with the cam 10a) to pivot about the cam follower pin 32 which engages the non-actuated cam 11a. The actuation of the control lever 31 causes the lever 29 which is positioned against the bottom wall of the shutter housing and is connected to the lever 31 by means of the cam follower pin 30, to swing or pivot. The pivoting movement of the lever 29 in turn is transmitted, by means of the pin 33, to the lever 27 and in consequence to the lever 25 through the common shaft or pin 26. The lever 25 in turn adjusts the diaphragm, by effecting an adjusting movement of the diaphragm adjusting ring 13.

In the case of the differential cam follower device as illustrated in FIGURE 5, the cam ring 10 which is connected to the exposure value setting ring 3, pivots (by means of the cam follower pin 24 engaged with the cam 10a) the double-armed lever 23, said pivotal movement being about the cam follower lug 23b which is engaged with the non-actuated cam 11a. In this organization the diaphragm is adjusted by means of the double-armed lever 19, whose arm 19c connected to the lever 23 is shifted either to the left or to the right (clockwise or counterclockwise) by means of the pivot pin 21, the direction of adjustment depending on the adjustment movement of the exposure value setting ring 3. In so pivotally moving, the lever 19 adjustably moves the diaphragm adjusting ring 13 by means of its lever arm 19a and the pin 18. If one of the limits of the diaphragm adjusting range, i.e., either of the values 2.8 or 22 as provided in the present embodiment of the invention, is reached in the course of the setting of the exposure value ring 3, without the exposure value which is applicable to the photograph which is to be taken being obtained, the exposure value setting operation is continued with the respective diaphragm limit, i.e., 2.8 or 22, being held constant and only the shutter speed being changed. For this purpose, the lost-motion driving device, in accordance with the invention, as provided between the cam rings 10 and 11 becomes operative. A direct driving connection between the two cam rings 10 and 11 is brought about by engagement between one or the other of the two ends of the slot 10c provided in the cam ring 10 and the driving pin 12.

(2) *Selection of a specific pair of speed-diaphragm values.*—The most suitable pair of speed-diaphragm values can be selected by rotating the speed setting ring 7. This method of setting does not cause rotation of the cam ring 10 connected to the exposure value setting ring 3. The diaphragm is adjusted by means of the cam 11a, through the differential cam follower device shown in FIGURES 3 and 5, in a manner similar to that explained for the exposure value setting operation, but the pivotal points of the control levers 31 and 23 will now occur at the opposite ends respectively, of these levers. Whereas in the exposure value setting operation the levers are pivoted about the follower lug 23b and the pin 32 respectively, the levers 31 and 23 are in the present case, i.e., upon operation of the speed setting ring 7, pivoted instead about the respective follower pins 24 and 30 engaging the cam 10a. The adjusting movement of the speed setting ring 7 terminates when one of the limits of the speed adjusting range or else the diaphragm adjusting range is reached.

Since, in order to insure an easy and simple operability, the embodiments of the invention do not provide for especially securing the exposure value setting ring 3 in various adjusted positions, the exposure value setting operation may also be carried out in a manner other than those of the above-described setting operation, namely by means of the speed setting member 7. This method of adjustment can be effected by keeping the diaphragm value, i.e., 2.8 or 22 constant and changing the shutter speed setting. In this case also the exposure value setting ring 3 is driven by the lost-motion driving device comprising the driving pin 12 engaging one end or the other of the two ends of the slot 10c in the cam ring 10.

The invention has been described by way of two embodiments, employing differential cam follower devices cooperating with separate cams. The differential cam follower device shown in FIGURE 3 represents a particularly suitable construction for cams which are of great length and great amplitude, whereas the cam follower device shown in FIGURE 5 is characterized by an extremely small number of parts being required. However, the invention is not limited to the embodiment shown, but may include the use of cam arrangements and constructions as well as differential cam follower devices of every possible kind, which insure that the exposure factors of the diaphragm aperture and shutter speed may be settable by means of the exposure value setting member in the manner described by the above steps.

It further lies within the scope of the invention, as a modification of the illustrated embodiment, to arrange for adjustment of the shutter speed instead of the diaphragm aperture as the additional independent function of the exposure value setting ring 3, whereas in such case the diaphragm aperture would then be adjusted by means of the second setting member 7.

Irrespective of the different embodiments which may be used to put the invention into effect, and irrespective of the kind of camera in which the invention is embodied, the advantages created by the invention with respect to small space requirements, operational simplicity and convenience, as well as setting and indicating accuracy are always fully obtainable.

Variations and modifications may be made within the scope of the claims, and portions of the improvements may be used without others.

I claim:

1. In a photographic camera having an adjustable diaphragm mechanism and an adjustable shutter speed mechanism, a movable, exposure value setting member; a movable, second setting member; a lost-motion driving connection between said setting members, enabling the same to have a predetermined limited relative movement; means including cam devices connected respectively with said setting members and comprising a pair of cams and a follower device responsive to and engaged with both cams, effecting adjustment of one of said mechanisms in response to movement of one setting member or the other, said members when moving simultaneously with no relative movement between them being inoperative to adjust said one mechanism, said second setting member being connected to the other of said mechanisms to adjust the latter at any time that the second setting member is moved, and said lost-motion driving connection providing for sufficient relative movement between the members to enable such movement to effect adjustment of the said one mechanism throughout its entire range.

2. The invention as defined in claim 1, in which the cams are coupled respectively to the setting members for simultaneous movement therewith, and in which the follower device comprises a differential follower means engageable with said cams, said differential follower means being connected to the said one mechanism.

3. The invention as defined in claim 2, in which the setting members comprise concentric rings, in which the cams are curved and have camming edges arranged to impart radial forces, and in which the cam follower means comprises levers the pivotal axes of which are substantially parallel to the axes of the said rings.

4. The invention as defined in claim 1, in which the said one mechanism comprises the adjustable diaphragm mechanism.

References Cited in the file of this patent

FOREIGN PATENTS

| 200,434 | Austria | Nov. 10, 1958 |
| 200,435 | Austria | Nov. 10, 1958 |